United States Patent [19]
Chupp

[11] 3,900,484
[45] Aug. 19, 1975

[54] 1,2,3,5-OXATHIADIAZOLIN-4-ONE,2-OXIDES

[75] Inventor: John Paul Chupp, Kirkwood, Mo.

[73] Assignee: Monsanto Company, St. Louis, Mo.

[22] Filed: Jan. 14, 1974

[21] Appl. No.: 433,184

[52] U.S. Cl. .................... 260/301; 71/91; 424/270
[51] Int. Cl.² ..................................... C07D 291/04
[58] Field of Search ..................................... 260/301

[56] References Cited
UNITED STATES PATENTS
3,290,302  12/1966  Eloy .................................... 260/301

*Primary Examiner*—Richard J. Gallagher
*Attorney, Agent, or Firm*—William I. Andress; Donald W. Peterson

[57] ABSTRACT

1,2,3,5-oxathiadiazolin-4-one,2-oxides of the formula wherein R is lower alkyl, $R^1$ is lower alkyl, each $R^2$ is independently halo or trifluoromethyl, n is 1 or 0 and m is 1 or 2 and are useful as herbicides.

11 Claims, No Drawings

1,2,3,5-OXATHIADIAZOLIN-4-ONE,2-OXIDES

This invention relates to 1,2,3,5-oxathiadiazolin-4-one,2-oxides of the formula

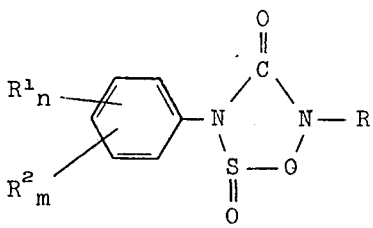

wherein R is lower alkyl, $R^1$ is lower alkyl, each $R^2$ is independently halo or trifluoromethyl, n is 1 or 0 and m is 1 or 2.

As employed herein, the term "lower alkyl" designates those groups wherein the aliphatic chain is straight or branched and has from 1 through 4 carbons inclusive. The term "halo" designates a halogen atom selected from fluorine, chlorine, bromine and iodine. Preferred halo are fluoro, chloro and bromo.

The compounds of this invention are conveniently and efficiently prepared by the reaction of an N-alkyl-N-hydroxy-N'-aryl urea with thionyl chloride. Usually the reaction mass contains an excess of thionyl chloride. Although the exact mechanism is not fully understood, it is postulated that the reaction proceeds according to the following chemical equation wherein R, $R^1$, $R^2$, m and n are as defined above.

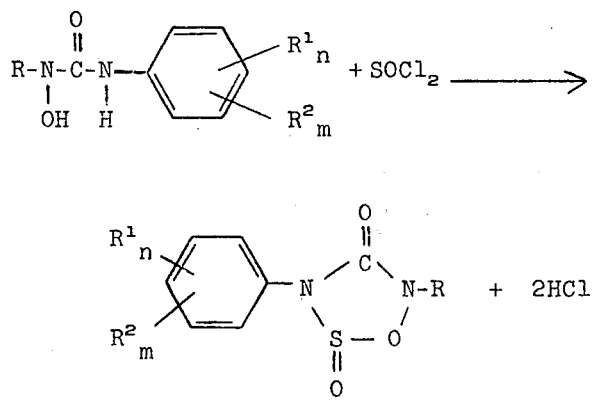

The reaction mass may consist only of the aforedescribed compounds and their reaction products or it may contain other components in addition such as diluents, other inert materials and solvents, i.e., common organic liquids which are inert under the reaction conditions and which may dissolve one or more of the reactants or products of the reaction, which solvents are exemplified by but not limited to chlorinated hydrocarbons, such as chloroform, methylene chloride, etc., aromatics such as benzene, toluene, xylenes, etc., ethers such as diethyl ether, diisopropyl ether, petroleum ether, etc., esters such as methyl acetate, ethyl acetate, propyl acetate, etc., and other organics such as tetrahydrofuran, etc.

The reaction is normally carried out at a temperature above the freezing point of the system but preferably not above its boiling point. Still more preferably, the reaction is carried out at temperatures of from about 0°C to about 80°C. The reaction is most conveniently carried out at ambient temperature allowing the exotherm of the reaction to raise the reaction mass to about the boiling point of thionyl chloride and then quenching with a suitable amount of solvent, in the presence of an excess of thionyl chloride. The reaction is usually carried out at atmospheric pressure, but higher or lower pressures may be utilized if equipment and other factors favor such higher or lower pressures. The reaction may be carried out in an open vessel or under reflux.

The compounds of this invention are useful as biocides. Exemplary of such biocidal uses for these products is the control of nematodes, arachnids, arthropods and insects as well as eradication of noxious weeds. These compounds are particularly useful as selective herbicides.

Pre-emergent and contact herbicidal compounds are useful in the selective killing of weeds in crops. In using the compounds of the present invention as pre-emergent and contact herbicides, the compounds can be used alone or in combination with a material referred to in the art as an adjuvant in liquid or solid form. Herbicidal formulations are prepared by admixing the compound which is the active ingredient of the formulation with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid or organic origin, water, a wetting agent, dispersing agent, an emulsifying agent or any suitable combination of these. The herbicidal formulations usually contain from about 0.01 percent to about 99 percent by weight of the active ingredient. Application of these formulations to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g. power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment, the active ingredients are applied in amounts from about 1 to about 50 or more pounds per acre. In applications to soil for the control of the growth of germinant seeds, germinative seeds, emerging seedlings and established vegetation, the active ingredients are applied in amounts from about 0.1 to about 25 or more pounds per acre. It is believed that one skilled in the art can readily determine from the teachings of this specification the general procedure for any application.

Thionyl chloride is a readily available commercial product, N-alkyl-N-hydroxy-N'-aryl ureas are either known compounds or may be prepared by known methods from known compounds. Exemplary of one of the known methods for preparing an N-alkyl-N'-aryl urea is the room temperature reaction of an N-alkylhydroxylamine hydrochloride with an aryl isocyanate in a solvent medium under neutralizing conditions such as in the presence of a trialkylamine. The structure of the compounds of this invention, illustrated by the following examples, has been confirmed by three dimensional X-ray crystal structure determination of the compound of Example 10.

EXAMPLE 1

25 milliliters (ml.) of thionyl chloride are charged to a suitable reaction vessel at room temperature, about 23°C. 8 grams (g.) of N-hydroxy-N-methyl-N$^1$-ortho-fluorophenyl urea are dissolved in the thionyl chloride. With stirring, the reaction mass is heated to reflux and refluxed for about 15 to 30 minutes. The reaction mass is washed with an equivalent amount of pentane. The pentane is then stripped from the reaction mass and an equivalent amount of diethyl ether is added. The mass is stirred and the diethyl ether is stripped from the reaction mass. The washing of the mass with pentane and ether is repeated until the unreacted thionyl chloride is removed from the reaction mass. Diethyl ether is added to the reaction mass and most of the mass is taken into solution. The insolubles in the reaction mass are removed by filtration. The filtrate is passed through a column packed with 100 to 200 mesh size granules of a magnesia silica gel and eluted with diethyl ether. The ether solution is washed with water, dried over magnesium sulfate and filtered. The diethyl ether is stripped off and the residual oil crystallizes upon scratching the inner wall of the container below the oil surface. The resulting solid is first recrystallized from methylcyclohexane and then from methanol. The white solid is found to have a melting point of about 72° to 74°C. and to be soluble in acetone. The compound is identified as 3-(ortho-fluorophenyl)-5-methyl-1,2,3-5-oxathiadiazolin-4-one,2-oxide having the formula

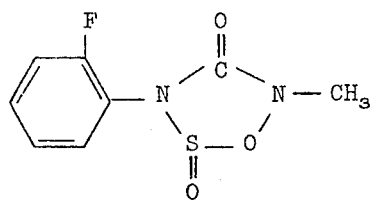

This formula is consistent with infra-red and proton magnetic resonance measurements.

Elementary Analysis (%)

| Element | C | H | N | S |
|---|---|---|---|---|
| Calculated: | 41.74 | 3.06 | 12.17 | 13.93 |
| Found: | 41.87 | 3.17 | 12.21 | 13.82 |

EXAMPLE 2

Approximately 15 ml. of thionyl chloride are charged to a suitable reaction vessel at room temperature, about 23°C. 10 g. of N-hydroxy-N-methyl-N'-meta-fluorophenyl urea are dissolved in the thionyl chloride. With stirring, the reaction mass is heated to reflux and refluxed for about 5 to 15 minutes. The reaction mass is washed with an equivalent amount of pentane. The pentane is then stripped from the reaction mass and an equivalent amount of diethyl ether is added. The mass is stirred and the diethyl ether is stripped from the reaction mass. The washing of the mass with pentane and ether is repeated until the unreacted thionyl chloride is removed from the reaction mass. Diethyl ether is added to the mass and most of the mass is taken into solution. The insolubles in the reaction mass are removed by filtration. The filtrate is passed through a column packed with 100 to 200 mesh size granules of a magnesia silica gel and eluted with diethyl ether. The ether solution is washed with water, dried over magnesium sulfate and filtered. The diethyl ether is stripped off and the residual oil crystallizes upon scratching the inner wall of the container below the oil surface. The resulting solid is recrystallized from cold methanol. The white solid is found to have a melting point of about 61° to 62°C. and to be soluble in acetone. The compound is identified as 3-(meta-fluorophenyl)-5-methyl-1,2,3-5-oxathiadiazolin-4-one, 2-oxide having the formula

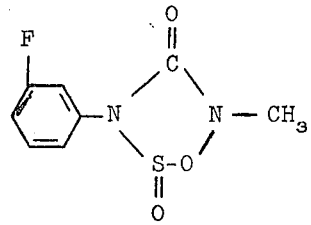

This formula is consistent with infra-red and proton magnetic resonance measurements.

Elementary Analysis (%)

| Element | C | H | N | S |
|---|---|---|---|---|
| Calculated: | 41.74 | 3.06 | 12.17 | 13.93 |
| Found: | 41.69 | 3.07 | 12.25 | 14.11 |

EXAMPLE 3

Approximately 25 ml. of thionyl chloride are charged to a suitable reaction vessel at room temperature, about 23°C. 15 g. of N-hydroxy-N-methyl-N'-para-chlorophenyl urea are dissolved in the thionyl chloride. With stirring, the reaction mass is heated to reflux and refluxed for about 15 to 30 minutes. The reaction mass is washed witih an equivalent amount of pentane. The pentane is then stripped from the reaction mass and an equivalent amount of diethyl ether is added. The mass is stirred and the diethyl ether is stripped from the reaction mass. The washing of the mass with pentane and ether is repeated until the unreacted thionyl chloride is removed from the reaction mass. Diethyl ether is added to the mass and most of the mass is taken into solution. The insolubles in the reaction mass are removed by filtration. The filtrate is passed through a column packed with 100 to 200 mesh size granules of a magnesia silica gel and eluted with diethyl ether. The ether solution is dried over magnesium sulfate and filtered. The diethyl ether is stripped off and the residual oil is dissolved in methanol and crystallizes upon scratching the inner wall of the container below the oil surface and cooling by placing the container in a dry ice/acetone slurry. The resulting solid is recrystallized from methylcyclohexane. The white solid is found to have a melting point of about 49° to 53°C. and to be soluble in acetone. The compound is identified as 3-(para-chlorophenyl)-5-methyl-1,2,3-5-oxathiadiazolin-4-one, 2,oxide having the formula

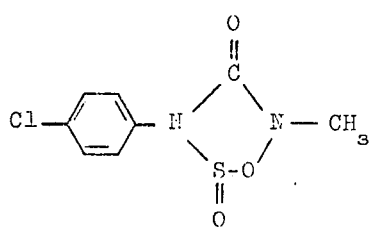

This formula is consistent with infra-red and proton magnetic resonance measurements.

Elementary Analysis (%)

| Element | C | H | N | S |
| --- | --- | --- | --- | --- |
| Calculated: | 38.95 | 2.86 | 11.36 | 13.00 |
| Found: | 39.22 | 2.92 | 11.23 | 13.07 |

EXAMPLE 4

Approximately 15 ml. of thionyl chloride are charged to a suitable reaction vessel at room temperature, about 23°C. About 10 g. of N-hydroxy-N-methyl-N'-meta-chlorophenyl urea are dissolved in the thionyl chloride. With stirring, the reaction mass is heated to reflux and refluxed for about 5 minutes. The reaction mass is washed with an equivalent amount of pentane. The pentane is then stripped from the reaction mass and an equivalent amount of diethyl ether is added. The mass is stirred and the diethyl ether is stripped from the reaction mass. The washing of the mass with pentane and ether is repeated until the unreacted thionyl chloride is removed from the reaction mass. Diethyl ether is added to the mass and most of the mass is taken into solution. The insolubles in the reaction mass are removed by filtration. The filtrate is passed through a column packed with 100 to 200 mesh size granules of a magnesia silica gel and eluted with diethyl ether. The ether solution is dried over magnesium sulfate and filtered. The diethyl ether is stripped off and the residual oil crystallizes upon seeding with crystals removed from the diethyl ether by filtration. The resulting solid is first recrystallized from isopropanol and then from hexane. The white solid is found to have a melting point of about 60° to 62°C. and to be soluble in acetone. The compound is identified as 3-(meta-chlorophenyl)-5-methyl-1,2,3-5-oxathiadiazolin-4-one,2-oxide having the formula

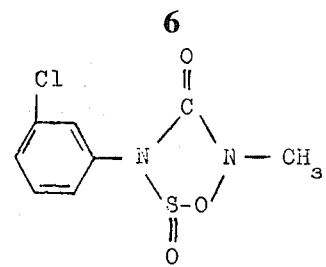

This formula is consistent with infra-red and proton magnetic resonance measurements.

Elementary Analysis (%)

| Element | C | H | N | S |
| --- | --- | --- | --- | --- |
| Calculated: | 38.95 | 2.86 | 11.36 | 13.00 |
| Found: | 38.97 | 2.89 | 11.29 | 13.19 |

EXAMPLE 5

Approximately 15 ml. of thionyl chloride are charged to a suitable reaction vessel at room temperature, about 23°C. 10 g. of N-hydroxy-N-methyl-N'-meta-trifluoromethylphenyl urea are dissolved in the thionyl chloride. The reaction mass is heated to reflux and refluxed for about 5 minutes. The reaction mass is washed with an equivalent amount of pentane. The pentane is then stripped from the reaction mass and an equivalent amount of diethyl ether is added. The mass is stirred and the diethyl ether is stripped from the reaction mass. The washing of the mass with pentane and ether is repeated until the unreacted thionyl chloride is removed from the reaction mass. The residual oil solidifies upon scratching the inner wall of the container below the oil surface. The resulting solid is first recrystallized from methylcyclohexane and then from pentane. The white solid is found to have a melting point of about 60° to 65°C. and to be soluble in acetone. The compound is identified as 3-(meta-trifluoromethylphenyl)-5-methyl-1,2,3-5-oxathiadiazolin-4-one,2-oxide having the formula

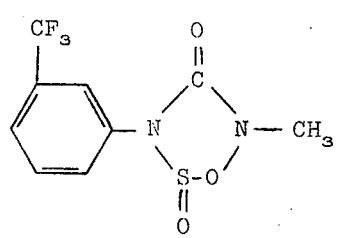

This formula is consistent with infra-red and proton magnetic resonance measurements.

Elementary Analysis (%)

| Element | C | H | N | S |
| --- | --- | --- | --- | --- |
| Calculated: | 38.57 | 2.52 | 10.00 | 11.44 |
| Found: | 38.84 | 2.54 | 10.02 | 11.40 |

EXAMPLE 6

Approximately 17 ml. of thionyl chloride are charged to a suitable reaction vessel at room temperature, about 23°C. 12 g. of N-hydroxy-N-methyl-N'-(4-chloro-2-trifluoromethylphenyl)urea are dissolved in the thionyl chloride. The reaction mass is heated to reflux and refluxed for about 5 minutes. The reaction mass is washed with an equivalent amount of diethyl ether. The ether is then stripped from the reaction mass and another equivalent amount of diethyl ether is added. The diethyl ether is again stripped from the reaction mass. Hexane is added to the residual solid and most of the mass is taken into solution upon boiling. The insolubles in the reaction mass are removed by filtration. Upon cooling, a white solid crystallizes from the filtrate and is removed by filtration. The resulting white solid is recrystallized from hexane. The white solid is found to have a melting point of about 102° to 105°C. and to be soluble in acetone and chloroform. The compound is identified as 3-(4-chloro-2-trifluoromethylphenyl)-5-methyl-1,2,3-5-oxathiadiazolin-4-one,2-oxide having the formula

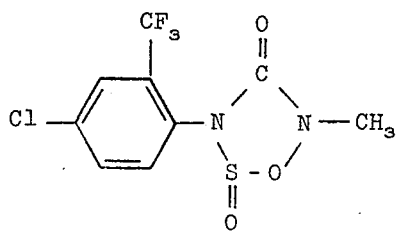

This formula is consistent with infra-red and proton magnetic resonance measurements.

Elementary Analysis (%)

| Element | C | H | N | S |
| --- | --- | --- | --- | --- |
| Calculated: | 34.35 | 1.92 | 8.90 | 10.19 |
| Found: | 34.48 | 2.01 | 8.73 | 10.27 |

EXAMPLE 7

Approximately 13 ml. of thionyl chloride are charged to a suitable reaction vessel at room temperature, about 23°C. 9 g. of N-hydroxy-N-methyl-N'-(2,5-difluorophenyl)urea are dissolved in the thionyl chloride. The reaction mass is heated to reflux and refluxed for about 5 minutes. The reaction continues with a noticeable exotherm after the heat source is removed. The mass is washed with an equivalent amount of diethyl ether. The ether is then stripped from the reaction mass and another equivalent amount of diethyl ether is added and the diethyl ether is again stripped from the reaction mass. The semi-solid residue is extracted with hot hexane which deposits white crystals upon cooling. The crystals are again recrystallized from hot hexane. The white solid is found to have a melting point of about 72° to 74°C. and to be soluble in acetone. The compound is identified as 3-(2,5-difluorophenyl)-5-methyl-1,2,3-5-oxathiadiazolin-4-one,2-oxide having the formula

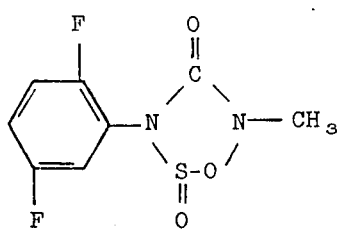

This formula is consistent with infra-red and proton magnetic resonance measurements.

Elementary Analysis (%)

| Element | C | H | N | S |
| --- | --- | --- | --- | --- |
| Calculated: | 38.71 | 2.44 | 11.29 | 12.92 |
| Found: | 39.14 | 2.57 | 11.31 | 12.89 |

EXAMPLE 8

Approximately 13 ml. of thionyl chloride are charged to a suitable reaction vessel at room temperature, about 23°C. 9 g. of N-hydroxy-N-methyl-N'-ortho-trifluoromethylphenyl urea are dissolved in the thionyl chloride. With stirring, the reaction mass is heated to reflux and refluxed for about 5 minutes. The heat is removed and the reaction continues with an exotherm. The reaction mass is washed with an equivalent amount of diethyl ether. The ether is then stripped from the reaction mass and an equivalent amount of diethyl ether is again added. The diethyl ether is stripped from the reaction mass. The washing of the mass with diethyl ether is repeated once more. The residue is extracted with boiling hexane. The insolubles in the reaction mass are removed by filtration. Crystals appear in the filtrate upon cooling and removed by filtration. Upon drying the white solid is found to have a melting point of about 94° to 96°C. and to be soluble in acetone. The compound is identified as 3-(ortho-trifluoromethylphenyl)-5-methyl-1,2,3-5-oxathiadiazolin-4-one,2-oxide having the formula

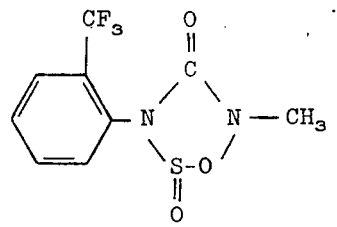

This formula is consistent with infra-red and proton magnetic resonance measurements.

Elementary Analysis (%)

| Element | C | H | N | S |
| --- | --- | --- | --- | --- |
| Calculated: | 38.57 | 2.52 | 10.00 | 11.44 |
| Found: | 38.47 | 2.38 | 10.10 | 11.32 |

EXAMPLE 9

20 ml. of thionyl chloride are charged to a suitable reaction vessel at room temperature, about 23°C. 12 g. of N-hydroxy-N-methyl-N'-(4-chloro-3Trifluoromethylphenyl)urea are added to the thionyl chloride. With stirring, the reaction mass is heated to boiling. The reaction mass is washed with aan equivalent amount of diethyl ether. The ether is then stripped from the reaction mass and an equivalent amount of diethyl ether is again added. The diethyl ether is again stripped from the reaction mass. The washing of the mass with diethyl ether is repeated until the unreacted thionyl chloride is removed from the reaction mass. After the last washing, an oil remains which is extracted in boiling hexane. Upon cooling the container in a dry ice-acetone slurry, a white-yellow solid appears which is recovered by filtration. The resulting solid is first recrystallized from hexane and then from pentane. The white solid is found to have a melting point of about 56° to 58°C. The compound is identified as 3-(4-chloro-3-trifluoromethylphenyl)-5-methyl-1,2,3-5-oxathiadiazolin-4-one,2-oxide having the formula

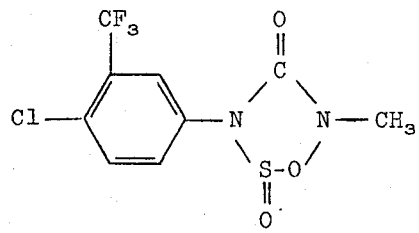

This formula is consistent with infra-red and proton magnetic resonance measurements.

Elementary Analysis (%)

| Element | C | H | N | S |
| --- | --- | --- | --- | --- |
| Calculated: | 34.35 | 1.92 | 8.90 | 10.19 |
| Found: | 34.88 | 2.00 | 9.08 | 10.25 |

EXAMPLE 10

Approximately 17 ml. of thionyl chloride are charged to a suitable reaction vessel at room temperature, about 23°C. 11.5 g. of N-hydroxy-N-methyl-N'-para-bromophenyl urea are dissolved in the thionyl chloride. With stirring, the reaction mass is heated and before the mass begins to boil, solids appear. To the reaction mass is added an equivalent amount of diethyl ether. A clear solution forms once more. The ether is then stripped from the reaction mass and an equivalent amount of diethyl ether is again added. The diethyl ether is again stripped from the reaction mass. The washing of the mass with diethyl ether is repeated until a viscous yellow oil remains. The residual oil forms a semi-solid upon scratching the inner wall of the container below the oil surface. The material is extracted with hot hexane. The residue on cooling and scratching produces a white solid which is recovered by filtration. The white solid is found to have a melting point of about 61° to 64°C. The compound is identified as 3-(parabromophenyl)-5-methyl-1,2,3-5-oxathiadiazolin-4-one,2-oxide having the formula

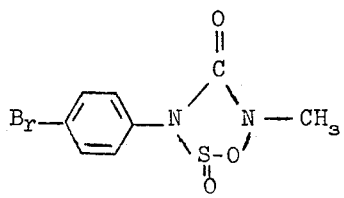

This formula is consistent with infra-red and proton magnetic resonance measurements. A three dimensional X-ray crystal structure determination confirms this structure.

Elementary Analysis (%)

| Element | C | H | N | S |
| --- | --- | --- | --- | --- |
| Calculated: | 33.00 | 2.42 | 9.62 | 11.01 |
| Found: | 33.11 | 2.41 | 9.57 | 11.02 |

EXAMPLE 11

Approximately 150 ml. of diethyl ether are charged to a suitable vessel with agitation means. To the ether is added 12.5 g. of N-methylhydroxylamine hydrochloride. A 5% excess by weight of triethylamine is then added. The mass is stirred overnight at ambient room temperature. While stirring continues, 0.08 moles of 3,4-dichlorophenyl isocyanate is added. The mass is evaporated until an oil remains. The residual oil crystallized upon scratching. Trituration with ether-pentane gives a white solid with a melting point of about 118° to 120°C. which is identified as N-hydroxy-N-methyl-N'-(3,4-dichlorophenyl)urea.

EXAMPLE 12

10 ml. of thionyl chloride are charged to a suitable reaction vessel at room temperature, about 23°C. 1.5 g. of N-hydroxy-N-methyl-N'-(3,4-dichlorophenyl)urea are dissolved in the thionyl chloride. With stirring, the reaction mass is heated to reflux and refluxed for about 15 minutes. The reaction mass is washed with an equivalent amount of pentane. The pentane is then stripped from the reaction mass and an equivalent amount of diethyl ether is added. The mass is stirred and the diethyl ether is stripped from the reaction mass. The washing of the mass with pentane and ether is repeated until the unreacted thionyl chloride is removed from the reaction mass. The residue is recrystallized from methylcyclohexane. The white solid is found to have a melting point of about 87° to 91°C., to be soluble in acetone, and to be insoluble in water. The compound is identified as 3-(3,4-dichlorophenyl)-5-methyl-1,2,3-5-oxathiadiazolin-4-one,2-oxide having the formula

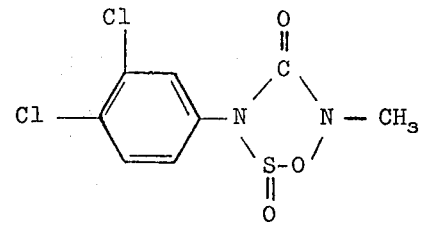

This formula is consistent with infra-red and proton magnetic resonance measurements.

EXAMPLES 13 THROUGH 28

Following the general procedure of Examples 1 through 12, but using the urea shown in Column A, the oxide of Column B is obtained.

| | EXAMPLE NO. A | EXAMPLE NO. B |
| --- | --- | --- |
| 13 | N-hydroxy-N-ethyl-N'-ortho-fluorophenyl urea | 3-ortho-fluorophenyl-5-ethyl-1,2,3,5-oxathiadiazolin-4-one,2-oxide |
| 14 | N-hydroxy-N-butyl-N'-meta-chlorophenyl urea | 3-meta-chlorophenyl-5-butyl-1,2,3,5-oxathiadiazolin-4-one,2-oxide |
| 15 | N-hydroxy-N-isopropyl-N'-meta-trifluoromethylphenyl urea | 3-meta-trifluoromethylphenyl-5-isopropyl-1,2,3,5-oxathiadiazolin-4-one,2-oxide |

−Continued

| | EXAMPLE NO. A | EXAMPLE NO. B |
|---|---|---|
| 16 | N-hydroxy-N-tert.butyl-N'-4-chloro-2-trifluoromethylphenyl urea | 3-4-chloro-2-trifluoromethylphenyl-5-tert.butyl-1,2,3,5-oxathiadiazolin-4-one,2-oxide |
| 17 | N-hydroxy-N-propyl-N'-2,5-difluorophenyl urea | 3-2,5-difluorophenyl-5-propyl-1,2,3,5-oxathiadiazolin-4-one,2-oxide |
| 18 | N-hydroxy-N-isobutyl-N'-para-bromophenyl urea | 3-para-bromophenyl-5-isobutyl-1,2,3,5-oxathiadiazolin-4-one,2-oxide |
| 19 | N-hydroxy-N-methyl-N'-(2-fluoro-4-tolyl) urea | 3-(2-fluoro-4-tolyl)-5-methyl-1,2,3,5-oxathiadiazolin-4-one,2-oxide |
| 20 | N-hydroxy-N-methyl-N'-(2,5-difluoro-3-tolyl) urea | 3-(2,5-difluoro-3-tolyl)-5-methyl-1,2,3,5-oxathiadiazolin-4-one,2-oxide |
| 21 | N-hydroxy-N-methyl-N'-(4-chloro-5-trifluoromethyl-2-tolyl) urea | 3-(4-chloro-5-trifluoromethyl-2-tolyl)-5-methyl-1,2,3,5-oxathiadiazolin-4-one,2-oxide |
| 22 | N-hydroxy-N-methyl-N'-(5-ethyl-2-trifluoromethylphenyl) urea | 3-(5-ethyl-2-trifluoromethylphenyl)-5-methyl-1,2,3,5-oxathiadiazolin-4-one,2-oxide |
| 23 | N-hydroxy-N-methyl-N'-(4-bromo-2-propylphenyl) urea | 3-(4-bromo-2-propylphenyl)-5-methyl-1,2,3,5-oxathiadiazolin-4-one,2-oxide |
| 24 | N-hydroxy-N-methyl-N'-(3,4-dichloro-5-isopropylphenyl) urea | 3-(3,4-dichloro-5-isopropylphenyl)-5-methyl-1,2,3,5-oxathiadiazolin-4-one,2-oxide |
| 25 | N-hydroxy-N-methyl-N'-(3-isobutyl-5-trifluoromethylphenyl) urea | 3-(3-isobutyl-5-trifluoromethylphenyl)-5-methyl-1,2,3,5-oxathiadiazolin-4-one,2-oxide |
| 26 | N-hydroxy-N-methyl-N'-(3,4-dichloro-2-ethylphenyl) urea | 3-(3,4-dichloro-2-ethylphenyl)-5-methyl-1,2,3,5-oxathiadiazolin-4-one,2-oxide |
| 27 | N-hydroxy-N-methyl-N'-2,4-dichlorophenyl urea | 3-(2,4-dichlorophenyl)-5-methyl-1,2,3,5-oxathiadiazolin-4-one,2-oxide |
| 28 | N-hydroxy-N-methyl-N'-2,5-dichlorophenyl urea | 3-(2,5-dichlorophenyl)-5-methyl-1,2,3,5-oxathiadiazolin-4-one,2-oxide |

EXAMPLE 29

Pre-emergent herbicidal activity of representative compounds of this invention is determined by the following procedure:

A good grade of top soil is placed in aluminum pans and compacted to a depth of three-eighths to one-half inch from the top of the pan. A predetermined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain the desired rate of application which is measured in terms of pounds per acre. The pans are then placed on a sand bench in the greenhouse and watered from below as needed. The plants are observed at the end of approximately 28 days and the results recorded.

The pre-emergent phytotoxic activity of the active ingredients is measured by the average percent control of each seed lot. The average percent control is converted to a relative numerical scale for the sake of brevity and simplicity in the examples. The pre-emergent phytotoxic activity index, as used in Table I, is defined as follows:

| Average Percent Control | | Numerical Scale |
|---|---|---|
| 0 – 25 | = | 0 |
| 26 – 50 | = | 1 |
| 51 – 75 | = | 2 |
| 76 – 100 | = | 3 |

The pre-emergent phytotoxic activity of some of the compounds of this invention are summarized in Table I. A dash (-) denotes that the species is not in the test.

TABLE I

| Compound of Example No. | 1 | 7 |
|---|---|---|
| Rate of Application (lbs./acre) | 5 | 5 |
| PLANT SPECIES: | | |
| Canada thistle | 2 | 3 |
| Cocklebur | 2 | 3 |
| Velvet leaf | 2 | 3 |
| Morning glory | 2 | 3 |
| Lambsquarters | 3 | 3 |
| Smartweed | 3 | 3 |
| Nutsedge | 0 | 1 |
| Quackgrass | 0 | 3 |
| Johnsongrass | 0 | 0 |
| Brome | 0 | 3 |
| Barnyard Grass | 1 | 3 |

EXAMPLE 30

Contact herbicidal activity of representative compounds of this invention is determined by the following procedure:

The compound to be tested is applied in spray form to plants of a given age of several grasses and broadleaf species. After the plants are the desired age, each aluminum pan of plants is sprayed with a given volume of a solution of the desired percent conentration of the candidate chemical. This solution is prepared from an aliquot of a 2% solution of the candidate compound in acetone, a known amount of cyclohexanone-emulsifying agent mix, and sufficient water to make up to volume. The emulsifying agent is a mixture comprising 35 wt. percent of a tall oil-ethylene oxide condensate having about 6 moles of ethylene oxide per mole of tall oil. The injuries to the plants are then observed approximately 14 days later and the results are recorded. The herbicidal rating is obtained by means of a fixed scale based on the average percent germination of each seed lot. The herbicidal ratings are defined as follows:

| | |
|---|---|
| 0 | No phytotoxicity. |
| 1 | Slight phytotoxicity. |
| 2 | Moderate phytotoxicity. |
| 3 | Severe phytotoxicity. |
| 4 | Plants all dead. |
| — | Not tested. |

Individual injury ratings for each plant type are reported in Table II.

A herbicidal solution concentration of 0.2 percent is substantially equivalent to an application rate of 4 pounds per acre.

TABLE II

| Compound of Example No. | 1 | 2 | 3 | 4 | 7 | 9 | 12 |
|---|---|---|---|---|---|---|---|
| Rate of Application (percent) | 0.2 | 0.2 | 0.2 | 0.2 | 0.2 | 0.2 | 0.2 |
| PLANT SPECIES: | | | | | | | |
| Canada thistle | 3 | 0 | 0 | 4 | 4 | 2 | 1 |
| Cocklebur | 4 | 1 | 1 | 2 | 3 | 2 | 3 |
| Velvetleaf | 3 | 1 | 1 | 1 | 4 | 1 | 4 |
| Morning glory | 2 | 2 | 2 | 2 | 3 | 2 | 3 |
| Lambsquarters | 4 | 0 | 2 | 2 | 4 | 4 | 4 |
| Nutsedge | 0 | 0 | 0 | 0 | 1 | 0 | 0 |
| Smartweed | 1 | 0 | 0 | 0 | 1 | 0 | 4 |
| Quackgrass | 0 | 0 | 0 | 0 | 3 | 0 | 0 |
| Johnsongrass | 0 | 0 | 0 | 0 | 0 | 0 | 0 |
| Brome | 0 | 0 | 0 | 0 | 3 | 0 | 0 |
| Barnyard Grass | 1 | 0 | 1 | 0 | 3 | 0 | 1 |

While this invention has been described with respect to certain embodiments, it is to be understood that it is not so limited and that variations and modifications thereof obvious to those skilled in the art to which this invention appertains can be made without departing from the spirit or scope thereof.

What is claimed is:

1. A compound of the formula

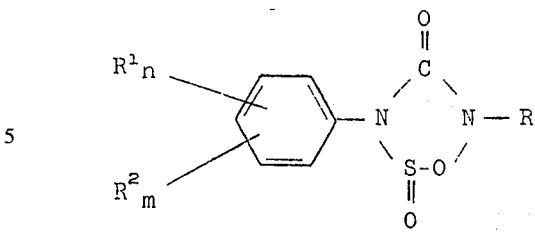

wherein R is lower alkyl, $R^1$ is lower alkyl, each $R^2$ is independently halo or trifluoromethyl, $n$ is 1 or 0 and $m$ is 1 or 2.

2. A compound of claim 1 wherein $m$ is 1.

3. A compound of claim 2 wherein $R^2$ is halo.

4. A compound of claim 2 wherein $R^2$ is trifluoromethyl.

5. A compound of claim 1 wherein $m$ is 2.

6. A compound of claim 5 wherein one $R^2$ is halo and the other $R^2$ is trifluoromethyl.

7. A compound of claim 5 wherein $R^2$ is halo.

8. A compound of claim 5 wherein $R^2$ is trifluoromethyl.

9. A compound of claim 1 wherein $n$ is 0.

10. A compound of claim 1 wherein R is methyl.

11. A compound of claim 10 wherein $n$ is 0.

* * * * *